June 4, 1929.  F. BRANDT  1,715,982
CLAMP BOLT MECHANISM
Filed Sept. 26, 1927
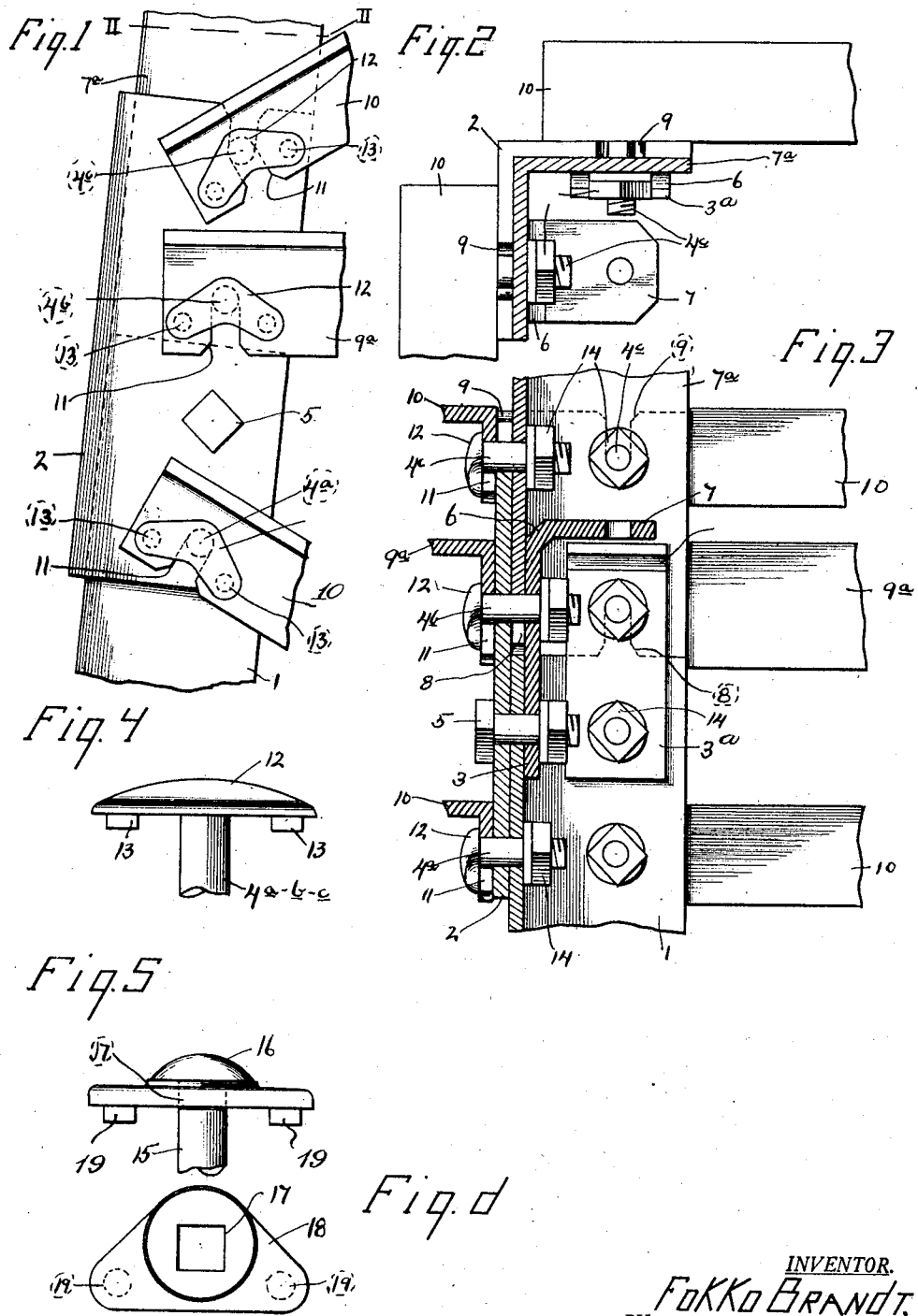

Patented June 4, 1929.

1,715,982

UNITED STATES PATENT OFFICE.

FOKKO BRANDT, OF KANSAS CITY, MISSOURI, ASSIGNOR TO BRANDT-KRELL ENGINEERING COMPANY, OF KANSAS CITY, KANSAS, A CORPORATION OF KANSAS.

CLAMP-BOLT MECHANISM.

Application filed September 26, 1927. Serial No. 222,174.

This invention relates to an improved bolt clamping mechanism for use in connection with members to be clamped together, and is particularly desirable in connection with angle iron derricks in clamping the sides of abutting leg sections and the braces and girts. It has long been understood that the preferred construction for the ends of girts and braces used in erecting derricks and the like is to form the ends with a bolt-receiving opening, the bolt snugly fitting the opening and thus producing a construction which is practically as strong as the unperforated metal. In such a construction, however, it is necessary to entirely unscrew the nut from the bolt, nuts and bolts are lost and more time is required in the construction or dismantlement of such a derrick. In view of the objections pointed out in connection with the perforated type of construction, it has heretofore been common practice to slot the ends of the girts and braces in order that they may be slipped on the bolt without necessitating the entire unscrewing of the nuts, but such a construction greatly weakens the joints. The improved construction of this invention, therefore, has as one of its objects to produce a clamp bolt mechanism, of such a nature that the slotted ends of girts and braces are reinforced by a part of the bolt, or by a separate washer of special construction hereinafter described, and also in which means is provided on the bolt for interlocking with the girt or brace to prevent such girt or brace from kicking upwardly and disengaging its slot from the bolt, especially if the bolt should work loose.

With the general objects named in view, the invention consists in certain novel and useful features of construction and combination of parts as hereinafter described and claimed; and in order that it may be fully understood, reference is to be had to the accompanying drawing, in which:

Figure 1 is a side elevation of a joint between upper and lower leg sections of a metallic derrick equipped with braces and girts and employing the improved clamping mechanism of the invention, one set of said braces and girts being omitted.

Figure 2 is a cross section taken through the upper leg of the derrick on the line II—II as illustrated in Figure 1, but with the braces and girts in horizontal position and on both outside faces of the derrick leg.

Figure 3 is a central vertical section through one set of the fastening connections as shown in Figure 2.

Figure 4 is a side elevation on an enlarged scale of a bolt head and stem of integral construction.

Figure 5 is a view similar to Figure 4, but indicates a separate washer and track bolt.

Figure 6 is a top plan view of the washer used with said track bolt.

In the said drawing, where like reference characters identify corresponding parts in all of the figures, 1 indicates the upper end of a derrick section of right angle shape, and 2, 3 and $3^a$ respectively indicate external and internal reinforce plates which project above the end of the leg section 1, the former however being of greater length. The reinforce plates are secured to the end of the leg 1 by means of bolts $4^a$ and 5, the bolt $4^a$ being of peculiar construction to be hereinafter described, and the bolt 5 being of any common and well known type.

The plates, 2, 3, and $3^a$ above the ends of the leg section 1 carry a bolt $4^b$ corresponding to the bolt $4^a$. The reinforce plates 3 and $3^a$ are preferably formed at their upper ends with inclined side portions 6, and plate 3 is provided with a horizontal perforated flange extension 7 which detachably engages with a gin pole, not shown, although both internal reinforce plates 3 and $3^a$ may be made to cooperate in sustaining the gin pole if very heavy weights are to be lifted. The gin pole structure is shown in Patent No. 1,539,109, issued May 26, 1925.

The lower end of the upper section $7^a$ of the derrick leg is slipped downwardly between plates 2 and 3 until it comes into edgewise abutment with the end of the leg section 1. The upper section $7^a$ being slotted at its end as at 8 to accommodate the bolts $4^b$, the inclined portions 6 of the internal plates 3 assisting in guiding the upper section into position.

Secured loosely in perforations adjacent the lower end of the upper section 7 are bolts $4^c$ corresponding to the bolts $4^a$ and $4^b$ hereinabove mentioned, the upper ends of the external reinforce angle iron plate 2 being slotted as at 9 to accommodate said bolts $4^c$.

After the parts have been positioned as above described, the girts $9^a$ and braces 10, formed at their ends with downwardly opening slots 11 to receive the bolts, are slipped into position between the heads 12 of bolts 4ª, 4ᵇ and 4ᶜ, said heads being of generally V-shape to bridge the slots 11 and being formed adjacent their ends with projecting pins 13 to interlock with sockets formed in the ends of the braces and girts as illustrated, it being understood that all of the bolts are normally sufficiently loose to permit the braces and girts to be engaged with the bolt stems without interference by the pins 13. When the girts and braces are in position and the pins 13 have been engaged with the sockets, the operator proceeds to tighten the nuts 14 on all of the bolts, it being evident that the interengagement of the pins with the braces and girts will prevent the bolts from rotating during the tightening of the nuts, and that said interengagement prevents the braces and girts from accidentally kicking upwardly should the nuts of the bolts become slightly loose. After the structure has once been assembled as described, it will be evident that the bolts 4ª, 4ᵇ and 4ᶜ will never have to be loosened more than a distance corresponding to the length of the pins 13 carried by the bolt heads 12.

In Figures 5 and 6 a modified or two-piece construction is illustrated. In this type of construction a track or equivalent bolt 15 having a rounded head 16 and a short square shank 17 cooperates with a washer 18 having a centralized square opening to receive the square shank of the bolt and being provided with a pair of projecting pins 19 to enter the sockets in the ends of the braces and girts. It will be readily evident that this type of bolt connection operates in all respects similar to the bolt connection above described.

From the above description it will be apparent that I have produced a construction of the character outlined which possesses all of the features of advantage set forth as desirable; and while I have described and claimed the preferred embodiment of the same, it is to be understood that I reserve the right to make all changes properly falling within the spirit and scope of the appended claims.

I claim:

1. The combination with a support having an opening, a member laterally-extending from said support and having formed in one of its edges a slot and having interlocking means spaced from the slot, and a bolt engaged with said opening in the support and slot of the member and having a head bridging the slot and interlocked with the interlocking means of said member for reinforcing the same.

2. The combination with a support having an opening, a member laterally-extending from said support and having formed in one of its edges a slot and a socket spaced from said slot, and a bolt engaged with said opening in the support and slot of the member and having a pin in engagement with the socket of said member.

3. The combination with a support having an opening, a member laterally-extending from said support and having formed in one of its edges a slot and a pair of sockets spaced from but adjacent the mouth of said slot, and a bolt engaged with said opening in the support and slot of the member and having a pair of pins in engagement with the sockets of the latter.

4. A structural member having a slot and interlocking means spaced from and on opposite sides of the slot, and a bolt extending through said member and having a head equipped with means interlocked with the interlocking means of said member.

5. A structural member having a slot and interlocking means spaced from and in a plane intermediate the ends of said slot, and a bolt extending through said member and having a head bridging the slot and equipped with means interlocked with the interlocking means of the member.

6. A structural member having a slot and a socket spaced from and in a plane intermediate the ends of said slot, and a bolt extending through said member and having a head bridging the slot and equipped with a pin interlocked with the socket of said member.

7. A structural member having a slot and a pair of sockets spaced from and on opposite sides and in a plane intermediate the ends of said slot, and a bolt extending through said member and having a head bridging the slot and equipped with pins interlocked with the sockets of said member.

In testimony whereof I affix my signature.

FOKKO BRANDT.